Sept. 18, 1951

R. R. TOWNSLEY 2,568,099

PULSE GENERATOR

Filed April 15, 1946

3 Sheets-Sheet 1

INVENTOR.
Ralph R. Townsley,
BY Brown, Jackson, Boettcher & Dienner
Attys.

Sept. 18, 1951 R. R. TOWNSLEY 2,568,099

PULSE GENERATOR

Filed April 15, 1946 3 Sheets-Sheet 2

INVENTOR.
Ralph R Townsley,
BY Brown, Jackson
Boettcher & Dienner
attys

Sept. 18, 1951 R. R. TOWNSLEY 2,568,099

PULSE GENERATOR

Filed April 15, 1946 3 Sheets-Sheet 3

INVENTOR.
Ralph R. Townsley,
BY Brown, Jackson,
Boettcher & Dienner
attys.

Patented Sept. 18, 1951

2,568,099

UNITED STATES PATENT OFFICE 2,568,099

PULSE GENERATOR

Ralph R. Townsley, Boston, Mass., assignor to Purdue Research Foundation, La Fayette, Ind., a corporation of Indiana Application April 15, 1946, Serial No. 662,127

8 Claims. (Cl. 250—27)

The present invention relates to pulse generators, and embodies improvements upon the pulse generating circuit disclosed in copending application Serial No. 540,234, filed June 10, 1944, by myself and John C. Baker and since abandoned.

The invention of this application and the invention of said copending application are both concerned primarily with producing a controlled pulse or wave of desired shape from a sine wave or from any wave even remotely approximating a sine wave. One of the features of both inventions is the ability to produce pulses of very short duration or narrow width, the circuits of both applications being capable of producing pulses which are shorter or narrower than one percent of the length of the cycle, where such extremely short duration is desirable. Another feature characterizing both inventions is the ability to produce a pulse or wave of ideal shape having no transients before or after it, and having no current in the reverse direction, as is so often true of pulse generating circuits of the prior art. Another feature of both inventions is the fact that extremely wide variations in tube characteristics, circuit constants and voltages have very little or practically no effect on the operation of the pulse generator. Another feature of the invention resides in its simplicity. The pulse generator is capable of operation at practically any desired frequency ranging say from 60 cycles to several megacycles.

One of the principal objects of the present invention is to provide an improved pulse generator capable of producing a rectangular pulse having the above attributes of narrow width, ideal shape, no transients, etc.

Another object of the invention is to provide an improved pulse generator capable of producing a saw tooth voltage wave having certain of the above attributes of ideal shape, not transients, etc.

Another object of the present invention is to provide an improved pulse generator capable of producing a trapezoidal voltage wave having certain of the above attributes of ideal shape, no transients, etc.

Other features, objects and advantages of the invention will appear from the following detail description of certain preferred embodiments thereof. In the accompanying drawings illustrating such embodiments:

Figure 1:
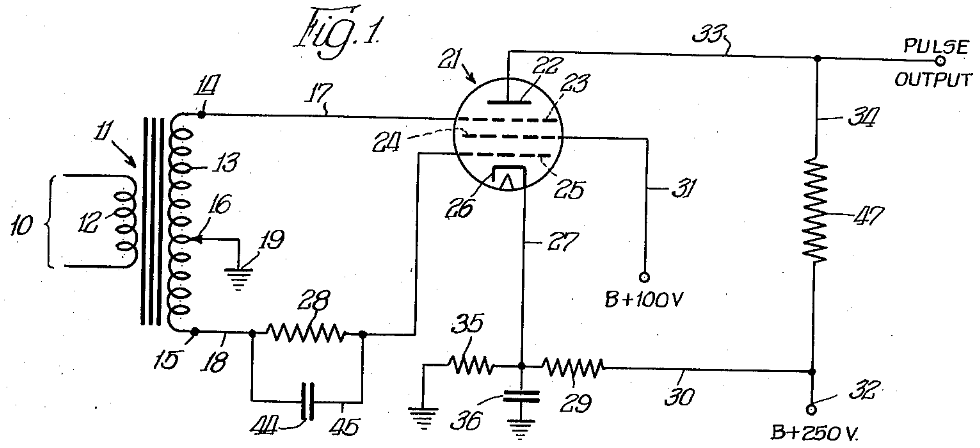
Figure 1 is a circuit diagram showing one embodiment of the invention for producing rectangular pulses.
Figure 5:
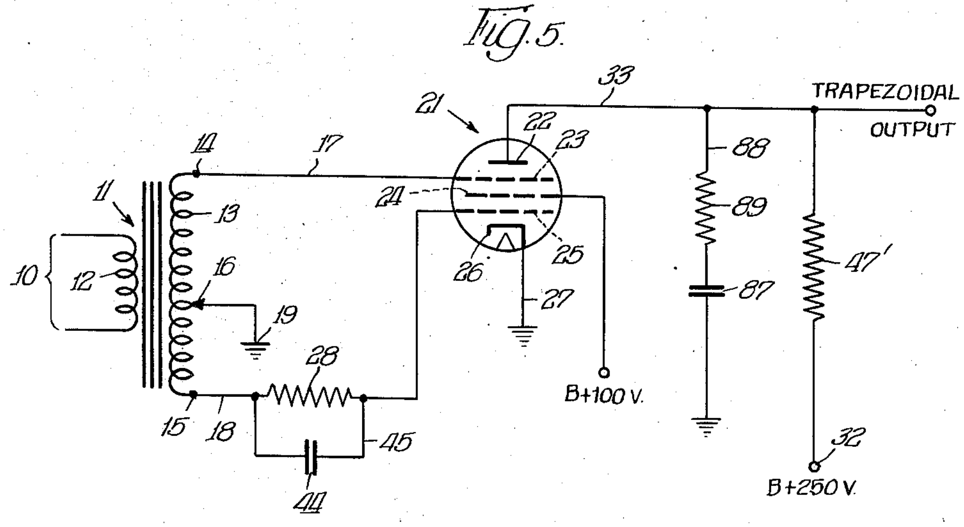
Figure 6:
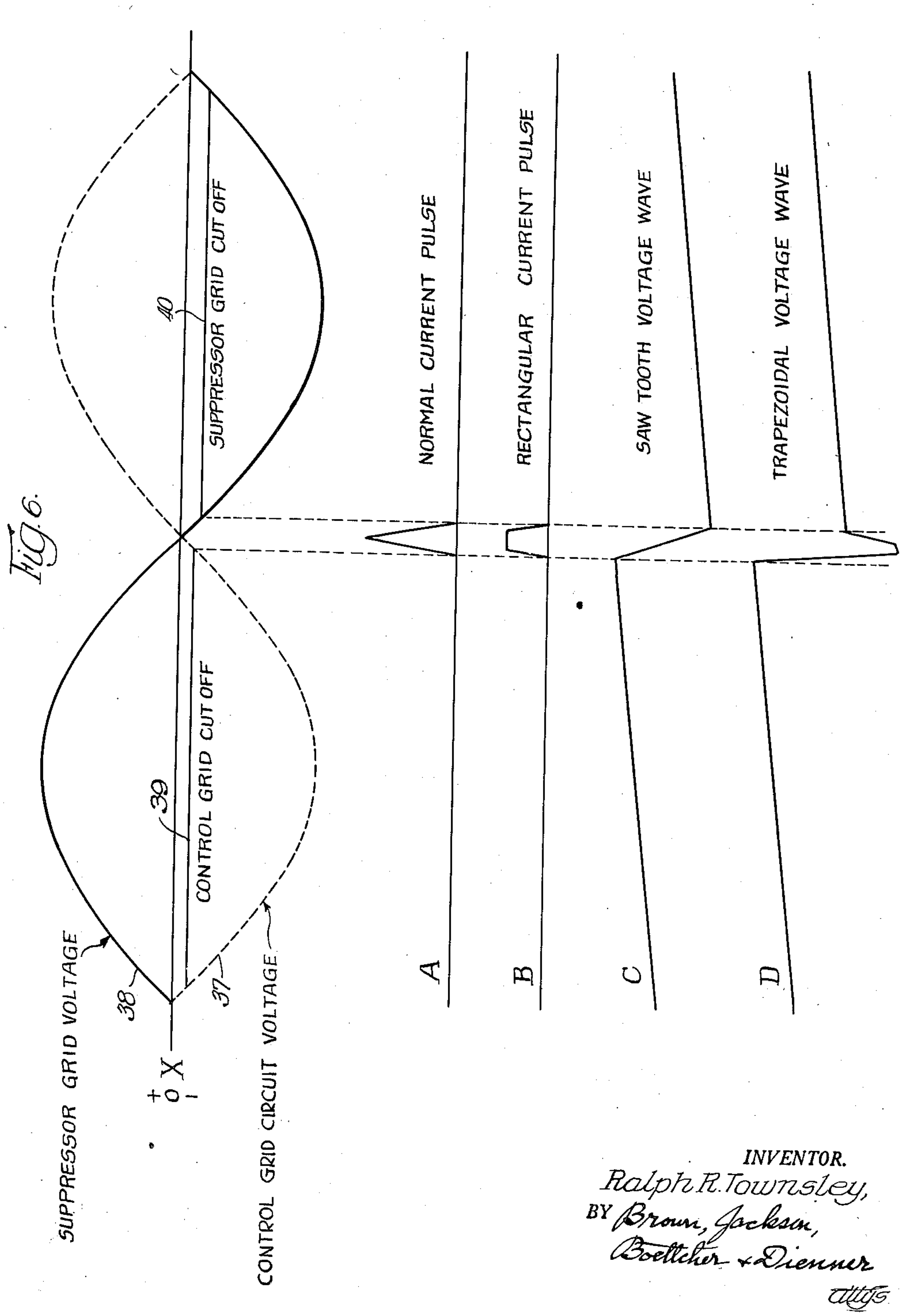

Figure 5 is another circuit diagram somewhat similar to Figure 1 showing another embodiment of the invention for producing a trapezoidal wave; and Figure 6 is a schematic diagram showing the timed relation between the sine wave voltages applied to the two grid circuits of the pulse tube in comparison with the rectangular pulse, the saw tooth wave or the trapezoidal wave produced by these sine wave voltages.

Referring first to Figure 1, the improved circuit is shown as being fed from a supply circuit 10 through the intervention of a transformer 11 having a primary winding 12 and a secondary winding 13. The secondary winding 13 has two end terminals 14 and 15 and an intermediate tap 16. The two terminals 14 and 15 are connected through conductors 17 and 18 with a multiple grid tube 21, and the intermediate tap 16 is connected with ground at 19. The tube 21 is preferably a pentode tube, such as a type 57 or 6SJ7 or other type of pentode tube which has the suppressor grid connection brought out to a separate base pin. However, it is to be understood that the invention is not necessarily limited to the use of one of these tubes. The tube comprises an anode or plate 22, a suppressor grid 23, a screen grid 24, a control grid 25, and a cathode 26. The end terminal 14 of the transformer secondary 13 is connected through conductor 17 with the suppressor grid 23, and the other end terminal 15 of the transformer secondary is connected through conductor 18 with the control grid 25. The cathode 26 may be of any preferred type, the supply circuit for the filament or heater not being shown. This cathode is connected to the bias voltage divider 35 and 29. A resistor 28 is interposed in conductor 18 leading to the control grid 25. The screen grid 24 is connected through conductor 31 with the positive terminal of a source of B voltage, usually in the neighborhood of 100 volts. The anode 22 is connected through conductor 33 with the circuit or apparatus utilizing the generated pulses, this anode also being connected at 34 with a source of B voltage, usually in the neighborhood of 250 volts. A plate load resistor 47 of approximately 50,000 ohms is shown as being interposed in the plate circuit conductor 34. This resistor may be replaced by whatever device is actually to receive the current pulse in many applications, and therefore need not be considered as part of the pulse generator circuit itself. This value is given, however, if a voltage pulse were desired to operate another vacuum tube, for example. The value is not at all critical. In general it may be said that at higher frequencies it should be of lower resistance. Its choice is determined the same as the plate resistor in any video amplifier. In situations where it is desired that the circuit shall generate only one pulse or wave per cycle, a condenser 44 is placed in a shunt circuit 45 around the resistor 28, as pointed out in detail in said copending application Serial No. 540,234.

The pulse which is generated in said prior application Serial No. 540,234 is generally triangular in shape. This is usually desirable in a wide variety of uses of pulse generators. Some uses, however, require a pulse of approximately rectangular shape. Such shape of pulse can be obtained directly from the herein described circuit of Figure 1 without having to resort to diode clippers and other expedients. The tube 21 is biased for normal class A operation as shown in Figure 1. Now let us assume that with the particular type of tube being used the control grid 25 is ten times as effective as the suppressor grid 23 in the control of plate current. By supplying ten times as much voltage to the suppressor grid 23 as to the control grid 25 the effect of the two grids tends to cancel each other so far as their effect on plate current is concerned, as long as neither approaches its cut off value. Of course, this linear relationship does not exist near cut off for either grid and beyond cut off for either grid the other has no effect. As a result, the maximum value of plate current is leveled off and held constant during the major portion of the pulse. The only circuit changes necessary are moving the tap 16 on the transformer secondary 13 to the proper point for correct voltage division between the control grid 25 and suppressor grid 23, and providing a fixed bias for Class A operation. A suitable voltage divider and by-pass condenser are shown for this in Figure 1. Conductor 27 extends from cathode 26 to ground through resistor 35 and condenser 36, and is also connected through resistor 29 and conductor 30 with the source of B voltage indicated at 32. The resistor 35 preferably has a value of approximately 500 ohms, the condenser 36 a value of approximately .25 microfarad, and the resistor 29 a value of approximately 50,000 ohms, such not being limitative, however. The resistor 28 preferably has a resistance of approximately .5 megohm and the condenser a capacity of approximately .0032 microfarad, particularly for input voltages in the neighborhood of 500 volts at 60 cycles, as pointed out in said copending application. Since the average plate current is very low as a result of the small percentage of time it is flowing it may be neglected in calculating the voltage divider for the fixed bias. The tap 16 on the transformer secondary 13, or the position of the tap on the potentiometer hereinafter described in connection with Figure 2, may either be calculated for the relative mutual conductance of the control and suppressor grids 25 and 23 of the tube, or simply determined experimentally to give the desired pulse shape as shown on an oscillograph.

Figure 2:
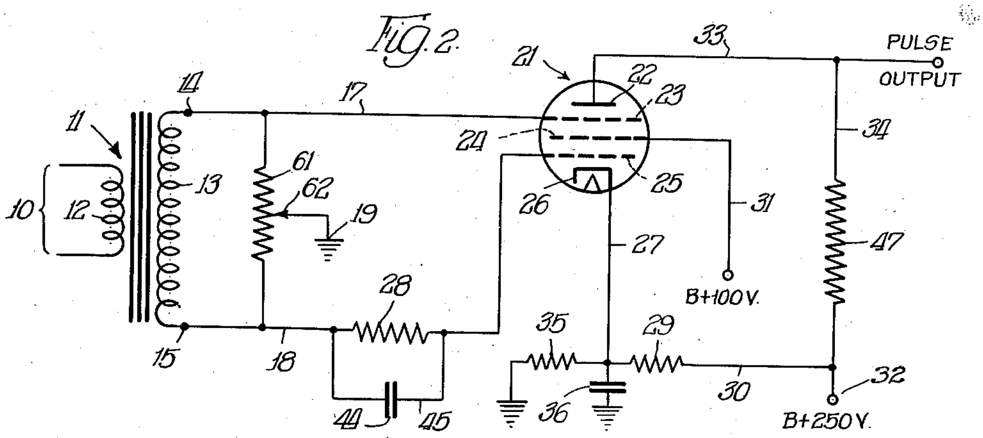
Figure 2 is a circuit diagram of another rectangular pulse generator showing the use of a potentiometer or voltage divider for supplying the out-of-phase voltages to the two grids of the pulse tube.

Figure 2 illustrates the same circuit for generating rectangular pulses as that shown in Figure 1 with the exception that a potentiometer is employed for supplying the out-of-phase voltages to the two grids 23 and 25 instead of the tapped secondary of transformer 11, as shown in Figure 1. This potentiometer is indicated at 61, being connected across conductors 17 and 18 constituting the input circuit of tube 21. The shiftable contact 62 of potentiometer 61 is connected to ground at 19. In all other respects the circuit is the same as that shown in Figure 1. It is adjusted and operated in substantially the same manner as described of Figure 1 for producing pulses of approximately rectangular shape, as shown at B in Figure 6.

Figure 3:
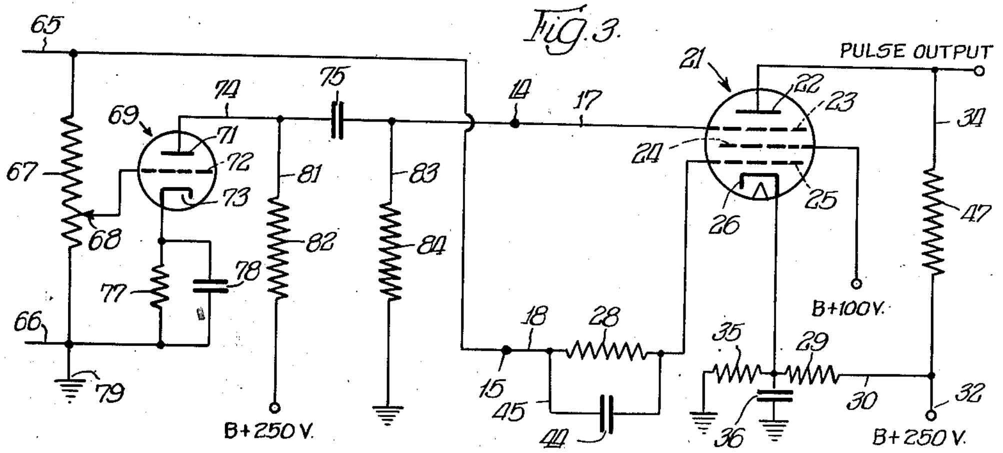
Figure 3 is a circuit diagram of another rectangular pulse generator showing the use of a phase inverter for supplying the out-of-phase voltages to the two grids of the pulse tube.

Figure 3 also shows a rectangular pulse generating circuit similar to that shown in Figure 1, except that it employs a vacuum tube phase inverter for supplying the out-of-phase voltages to the suppressor grid 23 and control grid 25 instead of the tapped secondary of Figure 1. The phase inverter is fed from a suitable source of alternating current of the desired frequency over supply conductors 65 and 66. As previously remarked, this frequency may range from 60 cycles on up to several megacycles. Connected across supply circuit 65, 66 is an input potentiometer 67 having a resistance of approximately 50,000 ohms, although this may be varied considerably for different circuits and different operating conditions. The adjustable contact 68 of the potentiometer is connected to the grid of a phase inverter tube 69, typically represented by a type 6J5 tube. This tube comprises an anode 71, a grid 72 and a cathode 73. The anode 71 is connected through conductor 74 and condenser 75 with conductor 17 which leads to the suppressor grid 23 of pulse tube 21. Control grid 72 of the phase inverter tube is connected with the adjustable tap 68 of the potentiometer 67, as previously described. Cathode 73 of this inverter tube has connection through parallel connected resistor 77 and condenser 78 with the input supply conductor 66, the latter preferably being grounded at 79. The resistor 77 preferably has a resistance of about 400 ohms and the condenser 78 preferably has a capacity of about 50 microfarad. The plate circuit of the inverter tube is completed through conductor 81 and resistor 82 leading to a source of B voltage, usually in the neighborhood of 250 volts. The resistor 82 preferably has a value of approximately 50,000 ohms, although this is subject to considerable variation. The condenser 75 preferably has a value of approximately .5 microfarad, but this likewise is subject to variation. The other side of this condenser 75 has connection through conductor 83 and resistor 84 with ground, the latter resistor preferably having a value of about .5 megohm. Input supply conductor 65 has direct connection with the other side of the pulse generator circuit so that it is connected through conductor 18 with control grid 25. Extending from the input terminals 14 and 15, the pulse generating circuit of this figure corresponds to that of Figure 1, and the operation is the same as that of Figure 1. All three circuits of Figures 1, 2 and 3 generate approximately rectangular current pulses such as are shown at B in Figure 6.

Figure 4:
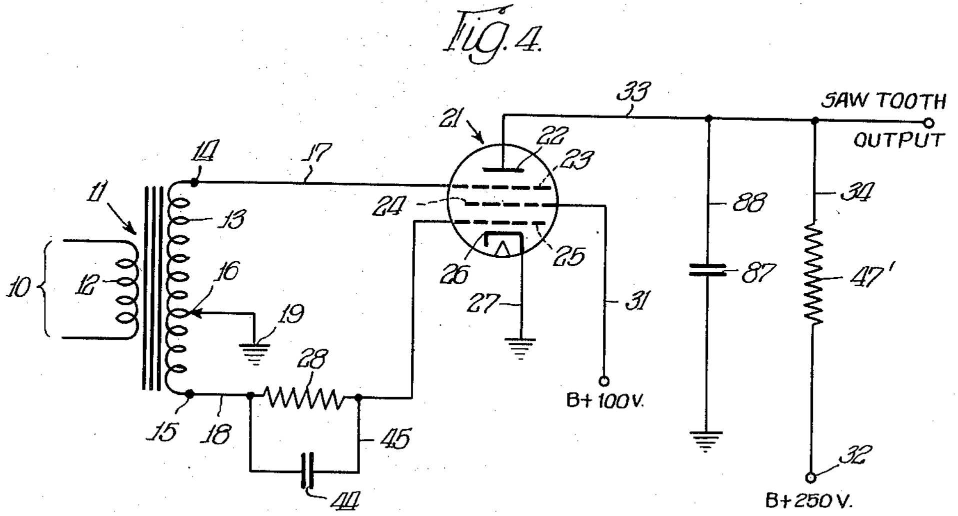
Figure 4 is a circuit diagram somewhat similar to Figure 1 showing another embodiment of the invention for producing a saw tooth wave.

Referring now to Figure 4, this illustrates a modified adaptation of the invention for the purpose of generating a saw tooth voltage wave. A saw tooth wave has particular application to oscilloscope and television sweep circuits. In this circuit the plate load resistor indicated at 47' has a substantially higher value than the plate load resistor 47 of Figure 1, preferably having a resistance of approximately 1 megohm. In addition, a condenser 87 is connected in conductor 88 between plate circuit conductor 33 and ground. This condenser preferably has a value in the neighborhood of .1 microfarad for 60 cycle operation. The suppressor grid 23, screen grid 24 and control grid 25 in this modified circuit are connected in the same way as described above in connection with Figure 1, and the cathode 26 is connected directly to ground through conductor 27. The grid resistor 28 and the grid condenser 44 preferably have the same values described above, i. e. approximately .5 megohm for the resistor and approximately .0032 microfarads for the condenser. In the operation of this modified form of circuit, the saw tooth voltage wave results from the fact that the condenser 87 is charged through the high resistance 47' while the pulse tube 21 is not conducting. Its size is chosen such that it can only reach a voltage that is a small percentage of the applied voltage before the pulse tube becomes conducting and rapidly discharges the condenser. Then the cycle starts over again. The charging curve is of the same shape as the exponential discharge curve (i. e. of condenser 44 described in said copending application Serial No. 540,234), except that it is an inverted form of this exponential discharge curve. By using only a small portion of this charging curve it is possible to use only that part of the curve which is essentially or substantially a straight line. This saw tooth voltage wave is indicated at C in the wave diagram of Figure 6.

Referring now to the circuit of Figure 5, this is another modified adaptation for the purpose of producing a trapezoidal voltage wave from a sine wave input. This circuit is the same as that of Figure 4 except that a resistor 89 is placed in series with condenser 87 between plate circuit conductor 33 and ground. Such trapezoidal form of voltage wave has particular utility in cathode ray tubes and television tubes. Some types of cathode ray tubes and television tubes employ magnetic deflection. Inasmuch as the magnetic deflecting coils must have a saw tooth current wave, it follows that a different shape voltage wave is necessary. This is the result of the inherent inductance of the coils. The actual wave is trapezoidal in shape and its proportions depend on the ratio of resistance to inductance of the deflecting coils as well as frequency and other factors. The addition of the resistor 89 enables this circuit to produce the trapezoidal voltage wave from a sine wave input. This will be understood from the following: The condenser 87 charges during the cut-off period just as in the saw tooth voltage generator of Figure 4 except that it is charged through the two resistors 47' and 89 in series. The output voltage includes the voltage drop across the resistor 89 as well as the tooth voltage across the condenser 87. The current through the condenser 87 is essentially or substantially constant during the charging period since the condenser current remains on the linear portion of the exponential. The drop across the resistor 89 is therefore approximately constant during the charging period. Thus, the output of the circuit is the sum of these voltages, and consists of a rectangular wave across the resistor 47' added to a saw tooth wave across the condenser 87 which gives the desired trapezoidal wave. The size of the condenser 87 is approximately the same as that in the saw tooth voltage generator of Figure 4 for the same frequency. The size of the resistor 89 depends on the characteristics of the deflecting coils used, and hence no definite value can be given. Normally it would be of the order of a few percent of resistor 47'. In practice, it would probably be determined experimentally. A typical form of trapezoidal voltage wave produced by the circuit of Figure 5 is illustrated at D in Figure 6.

The circuits of Figures 4 and 5 may be modified, if desired, to use the potentiometer 61 of Figure 2, or to use the vacuum tube phase inverter arrangement of Figure 3, for supplying the out-of-phase voltages to the grids 23 and 25 instead of the tapped secondary winding 13.

The operation of all five circuits illustrated in Figures 1, 2, 3, 4 and 5 will now be briefly described in connection with Figure 6. The sine curves in the upper portion of this figure represent a sine wave alternating current impressed on the supply circuit, but I wish to point out that this supply current need not have a true sine wave because the system is operative from practically any wave even remotely approximating a sine wave. It will be seen from Figure 6 that the suppressor grid 23 and the control grid 25 have voltage waves alternately applied thereto which are 180° out of phase. The control grid voltage is indicated by the dotted sine wave 37, and the suppressor grid voltage indicated by the full line sine wave 38, the zero axis of these two since waves being indicated at X. In the particular embodiment above described, the control grid cutoff is represented approximately by the horizontal line 39, and the suppressor grid cutoff is represented approximately by the horizontal line 40. The pulse generating circuit disclosed in said copending application Serial No. 540,234 generates a sharp pulse of current in the plate circuit of the pentode each time that the voltage wave crosses the zero axis, this sharp pulse being substantially triangular in form and being represented approximately by the triangular pulse A of Figure 6. The circuit may be operated to produce two pulses in each cycle, if desired, it being noted that they are always positive current pulses confined entirely to one side of the zero axis.

In the operation of the circuit, the ratio of the transformer 11 and the voltage impressed on the supply circuit 10 are so proportioned that the voltages 37 and 38 impressed on the control grid and on the suppressor grid are quite high as compared to the cutoff voltages for each of these grids. Because of the 180° phase displacement between the voltages impressed on these two grids, one grid or the other will be at a high negative potential for the greater part of each half cycle. This keeps the plate current cut off during that portion of each half cycle. As a starting point, let us take that part of the cycle in which the control grid 25 is starting to become negative. If the supply voltage 37 is high it will reach the required potential for plate current cutoff in a very few degrees, and the plate current will remain cut off until almost the end of the half cycle. During this same alternation, the suppressor grid 23, on the other hand, is being made just as positive as the control grid is being made negative. However, the electron stream has been stopped at the control grid 25, and hence the cutoff condition is not disturbed by the positive charge on the suppressor grid. This is particularly so in view of the fact that the screen grid 24 forms an electrostatic shield between the control grid 25 and suppressor grid 23, with the result that these two latter grids cannot counteract each other, once the cutoff is produced by the control grid. Near the end of the half cycle the control grid 25 again allows plate current flow. This produces a pulse, such as is typically represented by the triangular pulse A of Figure 6. During the next succeeding half cycle the control grid becomes positive, but at the same time the suppressor grid 23 becomes negative and quickly reaches a voltage sufficient to produce plate current cutoff and to maintain this cutoff until near the end of the second half cycle. Substantially at the end of this second half cycle another pulse of plate current is permitted to flow, such as another triangular pulse A. It will thus be seen that only near the time when the applied voltage wave crosses the zero axis is there any flow of plate current. In actual operation if an extremely narrow pulse is desired this plate current flow may be made less than one percent of the total cycle. In the illustrated arrangement, the triangular pulse A is shown as being of substantially greater width or time duration in order to facilitate illustration.

If fairly high voltages are used on the two grids 23 and 25, the control grid 25 may require appreciable power to drive it positive, and under these circumstances there is a possibility of this grid being damaged by excessive current. To eliminate this possibility the current limiting resistor 28 is interposed in conductor 18 in series with the control grid 25. This resistor has whatever resistance value is necessary to accomplish such protective function; under average operating conditions a resistance value of approximately .5 megohm is generally appropriate. This resistor 28 has no effect during the negative half cycle when the control grid 25 is blocking plate current. There is no need of such a resistance in series with the suppressor grid 23 because, when this grid is positive, the electrons have been stopped at the control grid 25, and therefore the electrons do not reach the suppressor grid.

As pointed out in said copending application Serial No. 540,234, the triangular pulse generated by the circuit of that application is of ideal shape, corresponding substantially to the triangular pulse A of Figure 6. That is to say, it has no transients before or after it, and it has no current in the reverse direction, such as is the case with most pulse generating circuits heretofore known. Extremely wide variations in tube characteristics, circuit constants and voltages have practically no effect on the operation of the circuit. The tube 21 operates between zero bias and cutoff so that very high output voltages may be obtained. As previously pointed out, the triangular pulse is greatly exaggerated in width in Figure 6 because actually on an oscillogram it may be made only a thin line in width, and in practice it may be made less than one percent of the length of the cycle.

If it is desired that the circuit only generate one pulse per cycle, the small condenser 44 is placed in a shunt circuit 45 around the resistor 28. This condenser is charged during the time that the control grid 25 is positive, due to the I. R. drop in this resistor. The size of this condenser 44 is so chosen that it will hold the control grid 25 beyond cutoff until after the elapsed time for the current pulse that would normally follow. It will, however, be discharged by the time for the pulse following the next half cycle. Thus, every other pulse is eliminated, and only one pulse per cycle results. This single pulse is also of an ideal shape, having no transients before or after it and no current in the reverse direction.

The determination of the value of the grid condenser 44 is somewhat involved, and attention is directed to said copending application Serial No. 540,234 for full particulars regarding it. Briefly stated, when this condenser discharges the voltage across it falls off exponentially, and the time constant of this discharge is so chosen that the voltage will leave the sine wave and become exponential at such point on the sine wave that when the sine wave passes through zero the value of the exponential voltage will be somewhat greater than the cutoff value of grid voltage for the tube, all as disclosed in complete detail in said copending aplication.

In the operation of the circuits of Figures 1, 2 and 3 for producing the substantially rectangular pulses B of Figure 6, the tube 21 is given a fiixed bias for normal class A operation, and the voltage division or ratio between the control grid 25 and suppressor grid 23 is adjusted for substantially equal effectiveness of the two grids, as previously described.

For example, let us assume that with the particular type of tube being used the control grid 25 is ten times as effective as the suppressor grid 23 in the control of plate current. By supplying ten times as much voltage to the suppressor grid 23 as to the control grid 25 the effect of the two grids tends to cancel each other so far as their effect on plate current is concerned, as long as neither approaches its cutoff value. Of course, this linear relationship does not exist near cutoff for either grid and beyond cutoff for either grid the other has no effect. As a result, the maximum value of plate current is leveled off and held constant during the major portion of the pulse. In the circuit of Figure 1 this is accomplished by moving the tap 16 on the transformer secondary to the proper point for correct voltage division between the control grid 25 and suppressor grid 23. In the circuit of Figure 2 it is accomplished by moving the shiftable contact 62 of potentiometer 61 for obtaining correct voltage division between the control grid and the suppressor grid. In the circuit of Figure 3 this is accomplished by moving the adjustable contact 68 of potentiometer 67 for obtaining the correct voltage ratio between the control grid and the suppressor grid of tube 21.

In the operation of the circuit of Figure 4, the saw tooth voltage wave results from the fact that the condenser 87 is charged through the high resistance 47′ while the pulse tube 21 is not conducting. The size of the condenser 87 is chosen such that it can only reach a voltage that is a small percentage of the applied voltage before the pulse tube becomes conducting and rapidly discharges the condenser. Then the cycle starts over again. The charging curve is of the same shape as the exponential discharge curve of condenser 44 described in said copending application Serial No. 540,234 except that it is an inverted form of this exponential discharge curve. By using only a small portion of this charging curve it is possible to use only that part of the curve which is substantially a straight line.

In the operation of the circuit of Figure 5 for producing a trapezoidal voltage wave of substantially the form indicated at D in Figure 6, the condenser 87 charges during the cutoff period just as in the saw tooth voltage generator of Figure 4, except that it is charged through the two resistors 47' and 89 in series. The output voltage includes the voltage drop through the resistor 89 as well as the tooth voltage across the condenser 87. The current through the condenser 87 is essentially or substantially constant since the condenser current remains on the linear portion of the exponential curve. The drop across the resistor is therefore approximately constant during the charging period. Thus, the output of the circuit is the sum of these voltages and consists of a rectangular wave across the resistor added to a saw tooth wave across the condenser which gives the desired trapezoidal wave.

The rectangular current pulse B of Figure 6 is of particular utility in the field of radar, but it may be useful in other fields as well. The saw tooth voltage wave C and the trapezoidal voltage wave D of Figure 6 are also of particular utility in the fields of television, radar and cathode ray sweep circuits, but these voltage waves may also be employed in other fields as well.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a pulse generator, the combination of tube means comprising a cathode, an anode, and first and second grids controlling plate current flow therebetween, a plate circuit impressing plate voltage upon said anode, an input circuit connected with said first and second grids, means for impressing opposite phase sine wave voltages on said input circuit for causing said grids to function alternately in blocking plate current flow, said voltages being such that a pulse will be generated in said plate circuit substantially at the end of that alternation when said first grid has negative voltage and said second grid has positive voltage, pulse producing means connected in said plate circuit for generating in impulse in said plate circuit responsive to operation of said tube means, and pulse selecting means for preventing the formation of a pulse at the end of the other alternation when said first grid has positive voltage and said second grid has negative voltage, said pulse selecting means comprising a resistor and a condenser connected in parallel in a network interposed in series in that side of said input circuit which is connected only with said first grid and said input means, said resistor-condenser network having a time constant which is a fractional part of the cycle of said sine wave voltage so as to obtain a variation of voltage across said network which is a relatively large fractional part of the peak voltage across it, said network being operative to impress said voltage variation on said first grid during the latter position of said other alternation whereby the voltage impressed on said first grid is caused to leave the sine wave impressed on said network and become exponential at such point on the positive sine wave that its exponential decay will carry it below the cut-off value of said first grid while the negative sine wave impressed on said second grid is still below the cut-off value of said second grid.

2. In a pulse generator, the combination of tube means comprising a cathode, an anode, and control and suppressor grids governing plate current flow therebetween, a plate circuit impressing plate voltage upon said anode, a source of B-voltage for said plate circuit, an input circuit connected with said two grids, means for impressing opposite phase sine wave voltages on said input circuit for causing said control and suppressor grids to alternate in cutting off plate current flow, said voltages being such that a pulse will be generated in said plate circuit substantially at the end of that alternation when said control grid has negative voltage and said suppressor grid has positive voltage, a resistor in series with said source of B-voltage, a condenser connected across said plate circuit adapted to be charged from said source of B-voltage through said resistor when said tube means is not conducting, whereby to generate a saw tooth voltage wave in said circuit, and means for preventing the formation of a pulse at the end of the other alternation when said control grid has positive voltage and said suppressor grid has negative voltage, said means comprising a resistor and a condenser connected in parallel in a network interposed in series in that side of said input circuit which is connected with said control grid, said network having values in the proportions of approximately .5 megohm to approximately .003 microfarad for input frequencies of approximately 60 cycles so as to have a time constant which is a relatively small percentage of the cycle of the sine wave voltage for obtaining a variation of voltage across said network which is in the order of 90% or more of the peak voltage across it, whereby during the latter alternation the voltage impressed on said control grid is caused to leave the sine wave impressed on said network and become exponential at such point on the positive sine wave that its exponential decay will carry it below the cut-off value of said control grid while the negative sine wave impressed on said suppressor grid is still below the cut-off value of said suppressor grid.

3. In a pulse generator, the combination of tube means comprising a cathode, an anode, and first and second grids controlling plate current flow therebetween, a plate circuit impressing plate voltage on said anode, a source of B-voltage for said plate circuit, an input circuit connected with said first and second grids, means for impressing opposite phase sine wave voltages on said input circuit for causing said grids to function alternately in blocking plate current flow, said voltages being such that a pulse will be generated in said plate circuit substantially at the end of that alternation when said first grid has negative voltage and said second grid has positive voltage, a resistor in series with said source of B-voltage, a condenser connected across said plate circuit adapted to be charged from said source of B-voltage through said resistor when said tube means is not conducting, whereby to generate a saw tooth voltage wave in said circuit, and means for preventing the formation of a pulse at the end of the other alternation when said first grid has positive voltage and said second grid has negative voltage, said means comprising a resistor and a condenser connected in parallel in a network interposed in series in that side of said input circuit which is connected with said first grid, said network having values in the proportions of approximately .5 megohm to approximately .003 microfarad for input frequencies of approximately 60 cycles so as to have a time constant which is a relatively small percentage of the cycle of the sine wave voltage for obtaining a variation of voltage across said network which is the order of 90% or more of the peak voltage across it, whereby during the latter alternation the voltage impressed on said first grid is caused to leave the sine wave impressed on said network and become exponential at such point on the positive sine wave that its exponential decay will carry it below the cut-off value of said first grid while the negative sine wave impressed on said second grid is still below the cut-off value of said second grid.

4. In a pulse generator, the combination of tube means comprising a cathode, an anode, and first and second grids controlling plate current flow therebetween, a plate circuit impressing plate voltage upon said anode, a source of B-voltage for said plate circuit, an input circuit connected with said first and second grids, means for impressing opposite phase sine wave voltages on said input circuit for causing said grids to function alternately in blocking plate current flow, said voltages being such that a pulse will be generated in said plate circuit substantially at the end of that alternation when said first grid has negative voltage and said second grid has positive voltage, a resistor in series with said source of B-voltage, a condenser connected across said plate circuit, and a resistor in series with said condenser, said condenser being adapted to be charged from said source of B-voltage through said two resistors in series when said tube means is not conducting, whereby to generate a trapezoidal voltage wave in said circuit, and means for preventing the formation of a pulse at the end of the other alternation when said first grid has positive voltage and said second grid has negative voltage, said means comprising a resistor and a condenser connected in parallel in a network interposed in series in that side of said input circuit which is connected with said first grid, said resistor-condenser network having a time constant which is a relatively small fractional part of the cycle of said sine wave voltage so as to obtain a variation of voltage across said network which is a relatively large fractional part of the peak voltage across it, whereby during the latter alternation the voltage impressed on said first grid is caused to leave the sine wave impressed on said network and become exponential at such point on the positive sine wave that its exponential decay will carry it below the cut-off value of said first grid while the negative sine wave impressed on said second grid is still below the cut-off value of said second grid.

5. In a pulse generator, the combination of tube means comprising an anode, a cathode, and a first and second control grid disposed therebetween, pulse producing means connected in said anode circuit for generating an impulse of a predetermined shape responsive to said tube means being rendered conductive, input means for impressing alternating, opposite-phase, sine wave voltages simultaneously on said control grids to effect conductivity of said tube at the termination of the particular alternation thereof when said first grid has negative voltage and said second grid has positive voltage impressed thereon, pulse selecting means comprising a resistor and a condenser connected in a parallel network and interposed in series between said input means and one of said grids, said network having a predetermined time constant which is a fractional part of the time cycle for said sine wave voltages, said network being operative to impress a voltage on said one grid only for a predetermined fractional portion of the cycle of the sine wave and to impress such voltage at a point in the sine wave cycle which approaches the terminating point of the other of said alternations, said network output voltage proportionately altering the voltage impressed on said one grid to bias same to cut-off prior to the rendering of the other grid positive by the opposite phase wave as the sine waves approach the termination of the other alternation, whereby the formation of a pulse at the termination of the other alternation of said cycle is thereby prevented.

6. In a pulse generator, the combination of a tube comprising an anode, a cathode and a pair of grids disposed therebetween, a source of B voltage for said anode circuit, pulse producing means connected in said anode circuit for generating an impulse of a predetermined shape responsive to said tube being rendered conductive, said means comprising a resistor connected in series with said source of B voltage, a condenser connected across said plate circuit adapted to be charged from said source through said resistor when said tube means is not conducting to effect generation of a saw tooth voltage wave in said circuit, input means for impressing alternating opposite-phase, sine wave voltages simultaneously on said control grids to effect conductivity of said tube at the termination of one of the alternations of the opposite sine waves impressed, pulse selecting means comprising a resistor and a condenser connected in a parallel network and interposed in series between said input means and one of said grids, said network having a predetermined time constant which is a fractional part of the time cycle for said sine wave voltages, said network being operative to impress a voltage on said one grid only for a predetermined fractional portion of the cycle of the sine wave and to impress such voltage at a point in the sine wave cycle which approaches the terminating point of the other of said alternations, said network output voltage accordingly altering the voltage impressed on said one grid to bias same to cut-off prior to the rendering of the other grid positive by the opposite-phase wave, whereby only one saw tooth pulse is effected for each sine wave cycle.

7. In a pulse generator, the combination of a tube comprising an anode, a cathode and a pair of grids disposed therebetween, a source of B voltage for said anode circuit, pulse producing means connected in said anode circuit for generating an impulse responsive to said tube being rendered conductive, said means comprising a condenser and a first resistor parallelly connected between said cathode and ground, and a second resistor connected between the cathode lead and the positive side of said source, input means including and alternating current supply circuit and a potentiometer connected thereacross for impressing alternating opposite-phase voltage waves simultaneously on said control grids to effect conductivity of said tube at the termination of one of the alternations of the opposite sine waves impressed, and pulse selecting means comprising a resistor and a condenser connected in a parallel network and interposed in series between said input means and one of said grids, said network having a predetermined time constant which is a fractional part of the time cycle for said sine wave voltage, said network being operative to impress a voltage on said one grid only for a predetermined fractional portion of the cycle of the sine wave and to impress such voltage at a point in the sine wave cycle which approaches the terminating point of the other of said alternations, said network output voltage accordingly altering the voltage impressed on said one grid to bias same to cut-off prior to the rendering of the other gird positive by the opposite wave, whereby only one outgoing saw tooth pulse is effected for each sine wave cycle.

8. In a pulse generator, the combination of a tube comprising an anode, a cathode and a first and second grid disposed therebetween, pulse producing means connected in said anode circuit for generating a rectangular shaped impulse responsive to said tube being rendered conductive, input means for impressing alternating opposite-phase sine voltages simultaneously on said control grids to effect conductivity of said tube at the termination of one of the alternations of the opposite sine waves impressed, said means comprising a supply circuit for supplying an alternating current of sine wave form, a potentiometer connected across said alternating current supply circuit, a phase inverter tube comprising an anode, grid and cathode, said latter grid being connected to the adjustable contact of said potentiometer, a resistor-condenser network connecting one side of said supply circuit with said cathode, input circuit conductors for said pentode tube comprising a first input conductor connecting with said second grid and a second input conductor connecting with said first grid, the anode of said phase inverter tube having electrical connection with said first input conductor, a condenser in said electrical connection, the other side of said alternating current supply circuit being connected with said second input conductor, pulse selecting means comprising a resistor and a condenser connected in a parallel network and interposed in series between said second input conductor and said first grid, said network having a predetermined time constant which is a fractional part of the time cycle for said sine wave voltage, said network being operative to impress a voltage on said one grid only for a predetermined fractional portion of the cycle of the sine wave and to impress such voltage at a point in the sine wave cycle which approaches the terminating point of the other of said alternations, said network output voltage accordingly altering the voltage impressed on said one grid to bias same to cut-off prior to the rendering of the other grid positive by the opposite phase wave, whereby only one rectangular pulse is effected for each sine wave cycle.

RALPH R. TOWNSLEY.

REFERENCES CITED

The following references are of record in the file of this patent:

UNITED STATES PATENTS

| Number | Name | Date |
|---|---|---|
| 2,190,504 | Schlesinger | Feb. 13, 1940 |
| 2,254,025 | Andrieu | Aug. 26, 1941 |
| 2,292,835 | Kepp | Aug. 11, 1942 |

OTHER REFERENCES

Radio Physics' Course by Ghirard, pages 494 through 497; 2nd ed. 1933; published by Radio & Technical Publishing Co.